United States Patent
Lin et al.

(10) Patent No.: US 7,424,056 B2
(45) Date of Patent: Sep. 9, 2008

(54) METHOD FOR MOTION ESTIMATION AND BANDWIDTH REDUCTION IN MEMORY AND DEVICE FOR PERFORMING THE SAME

(75) Inventors: Chin-Long Lin, San Jose, CA (US); Ren-Yuh Wang, Cupertino, CA (US)

(73) Assignee: SIGMATEL, Inc., Austin, TX (US)

( * ) Notice: Subject to any disclaimer, the term of this patent is extended or adjusted under 35 U.S.C. 154(b) by 770 days.

(21) Appl. No.: 10/614,673

(22) Filed: Jul. 4, 2003

(65) Prior Publication Data

US 2005/0002455 A1 Jan. 6, 2005

(51) Int. Cl.
*H04N 7/12* (2006.01)
(52) U.S. Cl. .................. 375/240.16; 382/236
(58) Field of Classification Search ............ 375/240.16; 382/236; 348/699
See application file for complete search history.

(56) References Cited

U.S. PATENT DOCUMENTS 5,576,772 A * 11/1996 Kondo ...................... 348/699
6,011,870 A * 1/2000 Jeng et al. .................. 382/236
6,442,203 B1 * 8/2002 Demos .................. 375/240.16

* cited by examiner

*Primary Examiner*—Gims Philippe
*Assistant Examiner*—Erick Rekstad
(74) *Attorney, Agent, or Firm*—Toler Law Group

(57) ABSTRACT

A device and a method are disclosed for motion estimation and bandwidth reduction in a memory. The device includes a memory for storing a plurality of frame data, a controller connected to the memory, a first motion estimation processor for performing a coarse-tuning operation and a second motion estimation processor for performing a fine-tuning operation. Similarity between a reference frame and a current frame is calculated based on the averages of every two adjacent pixels in the reference macroblocks and current macroblocks. The amount of calculations for determining motion estimation is greatly reduced, and bandwidth in utilizing the memory is accordingly reduced as motion estimation is advantageously achieved.

4 Claims, 2 Drawing Sheets

METHOD FOR MOTION ESTIMATION AND BANDWIDTH REDUCTION IN MEMORY AND DEVICE FOR PERFORMING THE SAME

BACKGROUND OF THE INVENTION

1. Field of the Invention

The present invention generally relates to motion estimation in an image processing system and, more particularly, to motion estimation and bandwidth reduction in a memory device 2. Description of the Related Art Motion estimation is the process of looking for the best motion vector that minimizes the prediction errors. Prediction error is defined as the difference between the current macroblock (MB) and the prediction MB. In MPEG (Moving Picture Experts Group) codec design, motion estimation demands large DRAM (dynamic random access memory) bandwidth. This is because a great deal of data must be transferred from the DRAM to the processors for achieving motion estimation. MPEG is the committee that developed international standards (such as MPEG-1, MPEG-2 and MPEG-4) that made interactive video on CD-Rom and digital TV possible.

In general, a frame is formed by a large amount of pixels generally including 8 bits, 16 bits, or 32 bits. For a frame with a size of 640×480 pixels where each pixel has 8 bits, there are a total 640×480×8 bits in the frame. If the image should be displayed with a rate of 60 frames per second, then there are 640×480×8×60 bits (about 147 Mbits) of data to be displayed in one second. Since calculation of motion estimation is related to frames of different time periods and an algorithm provided must contain several operation steps, the amount of calculation required in processing the image data is very great. If the bandwidth of the DRAM is not sufficient, the calculation of the motion estimation will be delayed due to insufficient provision of the frame data, thereby causing the display speed of video image to slow down significantly. There is an optional thus a general need in the act for motion estimation method and device advantageously overcoming the aforementioned shortcomings in the art. In particular, a need exists in the art for an optional method and device, for motion estimation and bandwidth reduction in a memory device where the amount of calculations is greatly reduced and the bandwidth of the memory device is significantly reduced in optionally providing motion estimation.

SUMMARY OF THE INVENTION

The present invention provides a motion estimation method for estimating a motion vector between a reference frame and a current frame, where each of the reference and current frames are formed by a plurality of pixels. The motion estimation method according to a preferred embodiment of the invention comprises the following steps dividing plurality of reference macroblocks, each comprising a plurality of adjacent pixels, is divided within each reference frame where a set of the reference macroblocks forms a search range. A current macroblock comprising a plurality of continuous pixels is divided from each current frame where each of said the reference macroblocks and current macroblocks has generally the same size and shape with corresponding pixel distribution. The similarity between one of the reference macroblocks and one of the current macroblocks is determined based on the averages of every two adjacent pixels in the current macroblock and one of the predetermined reference macroblocks, where two pixels for averaging is considered one pixel unit. All the similarities for the predetermined reference macroblocks in the search range are determined for performing a coarse tune operation. A preferred reference macroblock is determined from the predetermined reference macroblocks based on the similarities for the predetermined references macroblocks. The similarities for a second set of predetermined reference macroblocks around the preferred reference macroblock based on the pixels of the current macroblock and the second set of predetermined reference macroblocks for performing a fine tune operation. A motion estimation of the current frame and the reference frame is determined from the similarities for the second set of predetermined reference macroblocks.

Moreover, the present invention provides a motion estimation device for reducing memory output bandwidth comprising a memory serving as a frame buffer for storing a plurality of frame data, a controller connected to the memory for inputting and processing data of a current frame and a reference frame and outputting the processed data. The motion estimation device according to this particular embodiment of the invention further comprises a first motion estimation processor connected to the controller for coarse-tuning a motion estimation of the current frame to the reference frame inputted from the controller, and a second motion estimation processor connected to the controller and the first motion estimation processor for fine-tuning motion estimation of the current frame to the reference frame inputted from the controller and the first motion estimation processor.

BRIEF DESCRIPTION OF THE DRAWINGS

The various features and advantages of the present invention will be more readily understood from the following detailed description when read in conjunction with the appended drawings (not necessarily drawn to scale) in which.

DETAILED DESCRIPTION OF PREFERRED EMBODIMENTS

Figure 1:
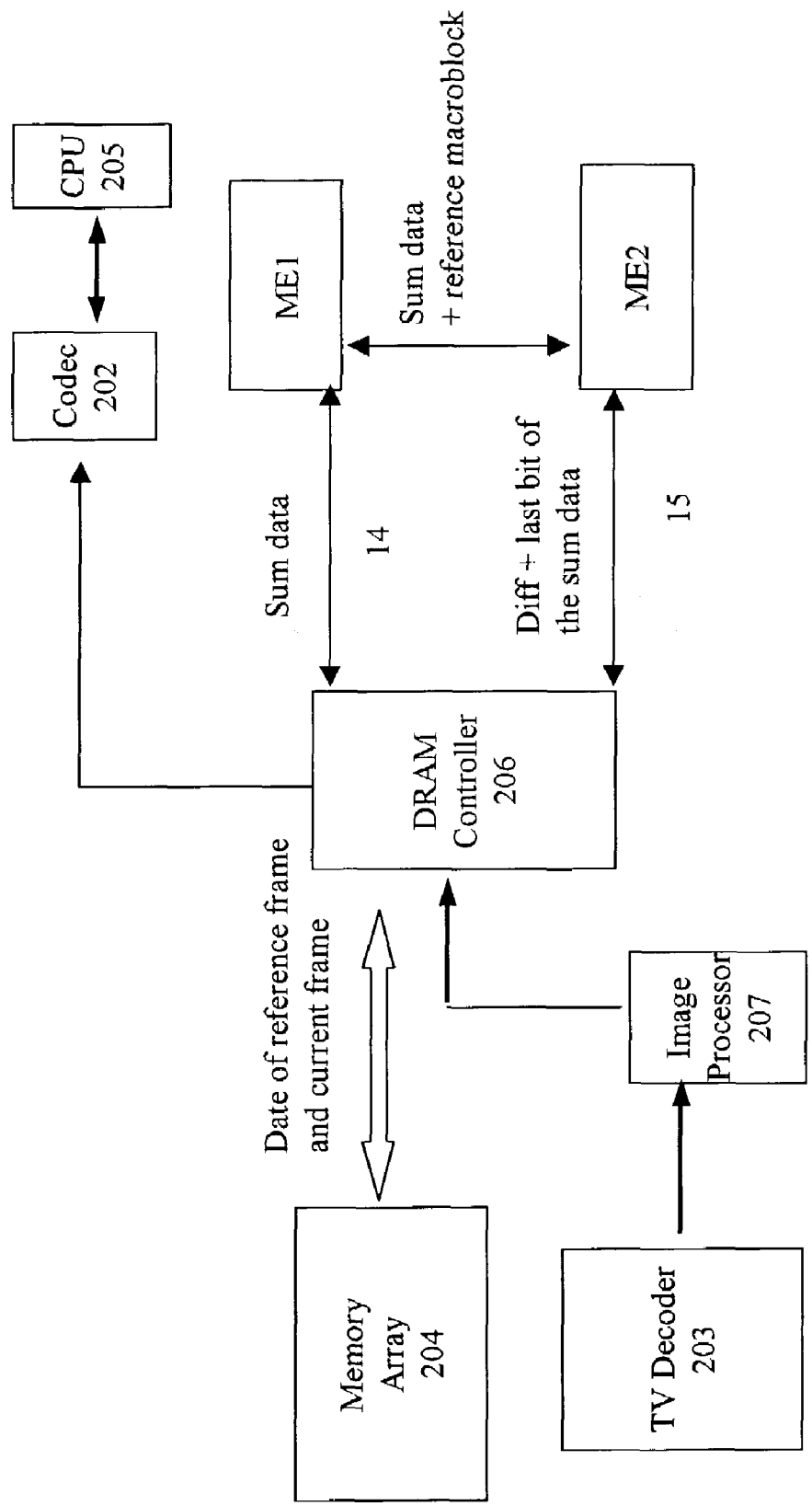
FIG. 1 is a block diagram illustrating an architecture and associated data flow for performing an exemplary operation of motion estimation according to a preferred embodiment of the invention.

FIG. 1 is a block diagram that illustrates an exemplary architecture and data flow for performing an exemplary operation of motion estimation in accordance with a preferred embodiment of the invention. The architecture according to this particular embodiment of the inventory comprises a codec 202 (encoder and decoder) coupled with a central processing unit (CPU 205), with a DRAM controller 206 coupled with two motion estimation processors ME1 and ME2. The architecture according this embodiment further comprises a memory array 204, a TV decoder 203 and an image processor 207 coupled with DRAM controller 206. Referring to FIG. 1, the single-chip video codec 202 (encoder and decoder) does not act like a core chipset in a personal computer (PC) system. For an encoder, it could take the video input from a variety of sources, such as TV decoder 202. The memory array 204 serves as a frame buffer for codec 202 in an encoding process. After the video image is compressed in codec 202, it is sent to an external CPU 205. The processing at the CPU 205 with respect to the compressed bit stream is application-dependent. The CPU 205 can simply store the compressed bit stream in a local hard drive (not shown), or a portable storage media such as a compact flash card (not shown). The CPU 205 can also send the compressed bit stream to a decoder for real-time decoding or for graphical display through wired or wireless communication means. Moreover, the CPU 205 can perform system multiplexing or de-multiplexing with other audio/video sources. The TV decoder 203 takes the compressed bit stream as the input and restores it to a format suitable for graphical display. The output data of a decoder can be sent to a TV, liquid crystal display (LCD) panel or an external CPU. For encoding and decoding, an external CPU 205 simply acts as a data transfer interface, with application-depending processing work in addition thereto.

In accordance with the image data processing structure and the process of data flow the processing according to a preferred embodiment of the invention, the memory array 204 is used as a frame buffer for reading and writing data. The memory array 204 is connected with a DRAM controller 206 that controls the read/write operation of the memory array 204. The DRAM controller 206 has two outputs 14, and 15 connected to two motion estimation processors, a first motion estimation processor ME1 and a second motion estimation processor ME2. According, the output 14 is connected to the first motion estimation processor ME1, and the output 15 is connected to the second motion estimation processor ME2. The first motion estimation processor ME1 performs a pixel search with the search range of ±16, ±32, or ±64 pixels. Based on the pixel search results from ME1, ME2 further conducts a local small area search to fine-tune the best motion vector search In the following, a frame of 640×480 pixels is utilized as an example in illustrating the operation of ME1 and ME2. A macroblock of 30×30 pixels is used herein as a unit for determining the motion vector between a reference frame (generally a previous frame) and a current frame. The macroblock (MB) in the reference frame is defined as a reference macroblock and a macroblock (MB) in the current frame is defined as a current macroblock. In motion estimation, it is desired to determine the motion relationship of the current frame relative to the former frame. An algorithm for finding the relationship between the reference frame and the current frame is utilized in accordance with the invention.

The pixels in the current frame by Pc, and the pixels in the reference frame are denoted by Pr. If the macroblock has a rectangular contour and a transversal length of n and a longitudinal length of m, the area of the macroblock cover n×m pixels. Moreover, the center of the current macroblock is at a pixel with the corresponding coordinate of (k, l). The motion estimation processor ME1 then performs the following operation, $$SAD = \sum_{i=0}^{n-1}\sum_{j=0}^{m-1} |Pc(k+i, l+j) - Pr(k+i, l+j)| \quad (1)$$

where SAD represents the sum of the absolutions of the differences for the current macroblock and reference macroblock. That is, the corresponding pixels in the current frame and the reference frame are subtracted from one another, and the absolution values of the differences are then summed. The second reference macroblock with a center shifting from the original reference macroblock is adopted to obtain another SAD between the current macroblock and the second reference macroblock. For example, the center of the second reference macroblock includes a shift of (a, b) from the original center (k, l). Accordingly, the center of the second reference macroblock is (k+a, l+b), where the SAD is calculated as follows, $$SAD = \sum_{i=0}^{n-1}\sum_{j=0}^{m-1} |Pc(k+i, l+j) - Pr(k+i+a, l+j+b)| \quad (2)$$

The SADs are calculated with coordinates (a, b), with (a, b) located in the range A for coarse tuning with a longitudinal length of r and transversal length of s. That is, the following calculations are performed, $$SAD(a, b) = \sum_{i=0}^{n-1}\sum_{j=0}^{m-1} |Pc(k+i, l+j) - Pr(k+i+a, l+j+b)| \quad (3)$$

$$-r/2 \leq a \leq r/2, \text{ and } -s/2 \leq b \leq s/2$$

In general, there are two motion estimation processors, one of which is used for coarse tuning, and the other for fine tuning. Namely, the shifting of the center of a macroblock in coarse tuning is generally larger than that of fine tuning. For example, for the first motion estimation processor ME1, the shifting of the center of a macroblock is one pixel. For the second motion estimation process ME2, the shifting of the center of the macroblock is 0.5 pixel.

For each SAD, there is a corresponding motion vector from the center of the reference macroblock to the center of the current macroblock. In the above exemplary calculations, for the current macroblock with a center at (k, l) and a reference macroblock with a center at (k+a, l+b), the motion vector is (a, b) (namely ((k+a, l+b)−(k, l)) corresponding to a SAD(a, b). In accordance with the invention, the motion vector with the smallest SAD among the SADs within coverage A is selected and provided as motion estimation connecting the reference frame and the current frame, namely, Motion estimation=Motion vector with min(SADs) (4)

Thus, the first motion estimation processor ME1 provides a first motion estimation based on the SADs calculated by coarse tuning. Then, in the second motion estimation processor ME2, the same procedure from equation (1) to equation (4) are generally repeated for the macroblock corresponding to the first motion estimation, as each shifting becomes smaller than that utilized in the first motion estimation processor ME1. For example, as the shift is equal to 0.5 pixel, the coverage is reduced to an area smaller than (r, s), namely (r', s'), where r'<r, and s'<s. A second motion estimation can similarly be determined based on the SAD calculated by fine tuning. The second motion estimation is adopted as motion estimation between the current macroblock and reference macroblock.

In determining the SAD in accordance with the invention in the ME1, the average of two adjacent pixels is utilized to acquire the SAD. That is, the equation 1 is replaced by the following equation:

$$SAD_{average} = \sum_{i=0}^{n-1}\sum_{j=0}^{m-1} |Sc(k+i, l+j) - Sr(k+i, l+j)| \quad (5)$$

where Sc(k+i, l+j)=(Pc(k+i, l+j)+Pc')/2, and Pc' is a pixel adjacent to the Pc(k+i, l+j).

In one embodiment according to the motion estimation methodology of the invention, each pixel is represented by 8 bits, i.e., each pixel has at most 256 gray level, then Pc(k+i, l+j) and Pc' include 8 bits. For a frame of 640×480 pixels, if a motion estimation processor is required to read all the pixels in the frame, then about 2.4 Mbits (640×480 ×8 bits) of data are read. In accordance with the invention, Pc(k+i, l+j) and Pc' are summed in the DRAM controller 206 before being read into the motion estimation processor ME1, and only the sum data is read into ME1. The sum of Pc(k+i, l+j) and Pc' accordingly includes 9 bits with one carrying bit in the summation operation, as Sc(k+i, l+j)=(Pc(k+i, l+j)+Pc')/2. In a binary operation, the average of two digital data is equal to the least significant bit of the sum of the two digital data, as Sc includes only 8 bits. For pixels Pc(k+i, l+j) and Pc', the first motion estimation processor ME1 only needs to read 8 bits instead of 16 bits of the Pc(k+i, l+j) and Pc'. That is, only half of the bits of a frame are read into first motion estimation processor ME1. However, since in equation (5), Sc(k+i, l+j)=(Pc(k+i, l+j)+Pc')/2, Sc includes only 8 bits, the first motion estimation processor ME1 can only read 8 bits for each two pixels instead of 16 bits of the Pc and Pc'. Therefore, the bandwidth required to transfer the same amount of data at the same time interval is substantially reduced, i.e., to at least one half.

The second motion estimation processor ME2 executes an operation of fine tuning for the current macroblock and reference macroblock where motion estimation is acquired in the first motion estimation processor ME1. Generally the same processes pursuant to equations (1) to (4) are performed, where all the pixels of a frame are read into ME2. Since the sum of two adjacent pixels are read in ME1, in the second motion estimation processor ME2 it is only necessary to read the difference of two adjacent pixels and sum values input from the first motion estimation processor ME1, the pixel values of a frame can then be restored accordingly.

If the pixels to be read are P1 and P2 which are adjacent to one another, then

SUM=$P1+P2$ and

DIFF=$P1-P2$

After ME2 reads the SUM and DIFF, ME2 can restore P1 and P2 by:

$P1$=(SUM+DIFF)/2; and $P2$=(SUM−DIFF)/2.

In accordance with the above mentioned embodiment of the motion estimation methodology of the invention, each pixel is represented by 8 bits. That is, each pixel includes at most 256 gray levels, with Pc(k+i, l+j) and Pc' having 8 bits. Pc(k+i, l+j) and Pc' are subtracted in the DRAM controller 206 before being read into the second motion estimation processor ME2. The different data are then read into the second motion estimation processor ME2. The DIFF of Pc(k+i, l+j) and Pc' accordingly has 9 bits including one sign bit and 8 bits of difference value. When the first motion estimation processor ME1 reads the sum data, the last bit of the sum data is not read into first motion estimation processor ME1. This last bit is transferred to ME2 for restoring the original data. Consequently, for each two adjacent pixels, there are ten bits of data being transferred to the second motion estimation processor ME2 from the DRAM controller 206, instead of 16 bits as may be required in the prior art. Thus, the bandwidth necessary for transferring data from the DRAM controller 206 to the second motion estimation processor ME2 is substantially reduced, as much as 62.5% as opposed to that in the prior art.

In accordance with a preferred embodiment, the motion estimation method according to the present invention comprises the steps of: (a) displaying an image in a plurality of frames corresponding to a plurality of time periods, wherein each frame further comprises a given number of pixels and each pixel is represented by two-dimensional abscissa and ordinate coordinates, wherein each frame further comprises at least one macroblock having a lesser number of pixels than the given number of pixels of the frame, wherein a current frame is one of the frames in a current time period of the plurality of time periods, wherein the current frame further comprises at least one current macroblock having a lesser number of pixels than those of the current frame, wherein a reference frame is one of the frames in a time period of the plurality of time periods prior to the current time period for the current frame, wherein the reference frame further comprises at least one reference macroblock having a lesser number of pixels than those of the reference frame, (b) averaging two adjacent pixels of the current macroblock, (c) repeating step (b) for all pixels of the current macroblock, (d) averaging two adjacent pixels of the reference macroblock, (e) repeating step (d) for all pixels of the reference macroblock, (f) subtracting the averaged pixels of the current macroblock from the corresponding averaged pixels of the reference macroblock resulting in a plurality of differences, (g) taking a plurality of absolute values for the differences resulting in a plurality of absolutions, (h) summing the absolutions resulting in a SAD (sum of the absolutions of the differences), (i) shifting abscissa and ordinate coordinates of the reference macroblock by corresponding abscissa and ordinate shift values resulting in a shifted reference macroblock, (o) averaging two adjacent pixels of the shifted reference macroblock, (k) repeating step (j) for all pixels of the shifted reference macroblock, (l) subtracting the averaged pixels of the current macroblock from the corresponding averaged pixels of the shifted reference macroblock. resulting in an additional plurality of differences, (m) taking an additional plurality of absolute values for the additional differences resulting in an additional plurality of absolutions, (n) summing the additional absolutions resulting in an additional SAD (sum of the additional absolutions of the additional differences), (o) repeating steps (i), (j, (k), (l), (m) and (n) resulting in a plurality of additional SADs, and (p) taking a minimum SAD out of the SAD and the additional SADs. Further according to the method of the invention, the two adjacent pixels of the reference macroblock are restored by summing first and second of the two adjacent pixels resulting in an adjacent sum, subtracting the first pixel from the second pixel resulting in an adjacent difference, wherein the first pixel is equal to:

(the adjacent sum+the adjacent difference)/2 wherein the second pixel is equal to:

(the adjacent sum−the adjacent difference)/2.

Figure 2:
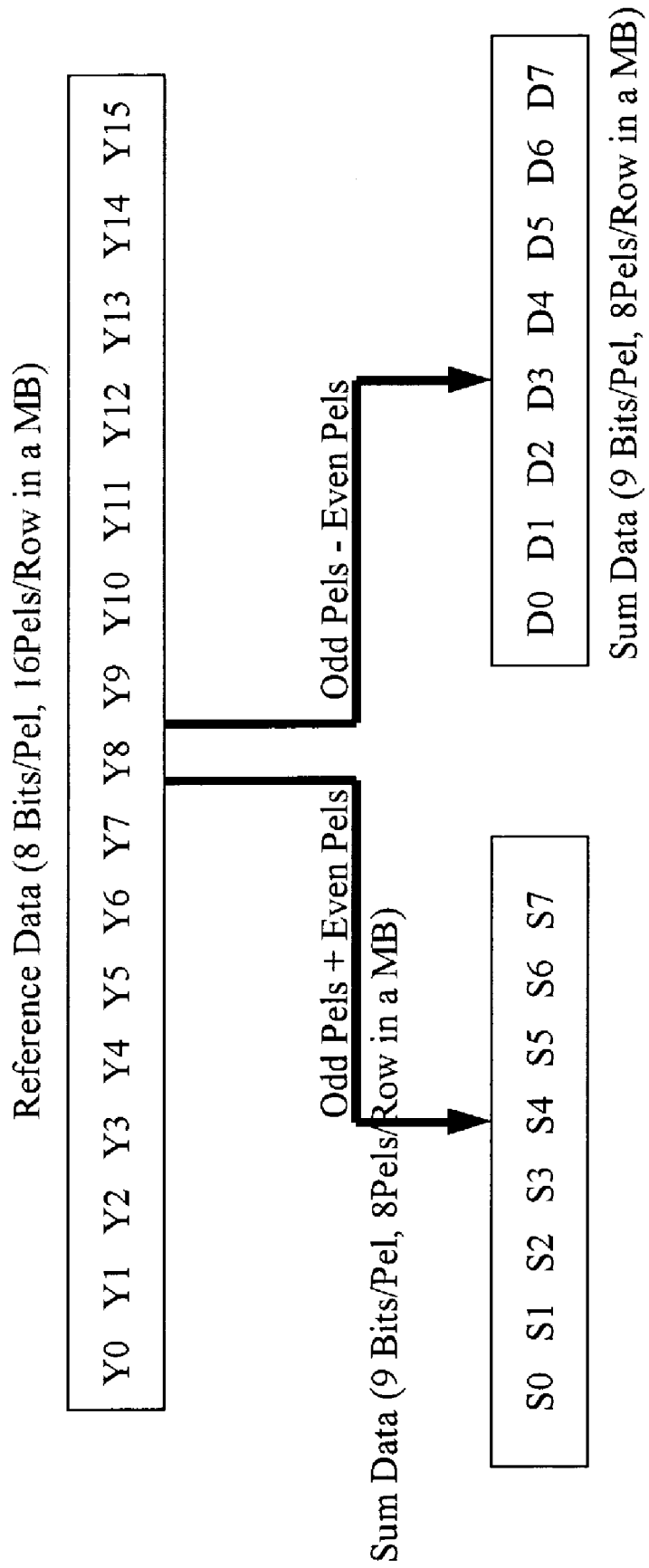
FIG. 2 is an exemplary schematic view illustrating the processing of the image data according to the invention.

FIG. 2 is an exemplary Schematic view that illustrates the processing of image data according to the invention. Referring to FIG. 2, there are 16 pixels, i.e., Y0, Y1, Y2, Y3, Y4, Y5, Y6, Y7, Y8, Y9, Y10, Y11, Y12, Y13, Y14, Y15, to be read from the memory. The method for summing and taking difference values (i.e., obtaining SUM and DIFF data) can be summarized as the following:

Y0 Y1 Y2 Y3 Y4 Y5 Y6 Y7 Y8 Y9 Y10 Y11 Y12 Y13 Y14 Y15→S0 S1 S2 S3 S4 S5 S6 S7 (SUM)→D0 D1 D2 D3 D4 D5 D6 D7 (DIFF)

Each of Yi, Si and Di represents a pixel. For Yi, each pixel includes a width of 8 bits. For S and D, the pixel width is 9 bits. S and D are computed as follows:

S0=Y0+Y1, S1=Y2+Y3, ... , S7=Y14+Y15

D0=Y1−Y0, D1=Y3−Y2, ... , D7=Y15−Y14

In the first motion estimation processor ME1, only the SUM part (8 bits/pixel, 8 pixel/row) is read from the memory array 204, the 50% of the DRAM bandwidth is advantageously conserved in ME1.

In where at least ME2, only the DIFF part (10 bits/pixel, 8 pixels/row) is read from memory array 204, where at least 40% of the DRAM bandwidth in advantageously conserved in ME2.

Other then estimating based on a frame, the present invention can be used to field estimation because in some imaging systems, the images are displayed in the order of first displaying even lines and then displaying the odd lines. Accordingly, the image similarities between two even lines are greater than those between two adjacent lines. Therefore, an image frame is divided into a frame having two sub-images, one being called the even image frame formed by the even lines in the image frame and the other being called the odd image frame formed by the odd lines in the image frame. A top field motion vector for the even image and the bottom field motion vector for the odd image are calculated by the aforementioned structure and process in accordance with the present invention. A field motion vector is then acquired by summing the top and bottom field motion vectors.

In addition, for an image, the present invention advantageously allows that the frame motion estimation and field motion estimation to be determined generally simultaneously, where the one having a preferred effect is used as a selected motion estimation of the current macroblock.

Tables 1 and 2 illustrate the simulation results in comparing the effects of the present invention and the method utilized in the prior art, where the overall bandwidth saving for the present invention over the prior art is at least 42% to 46%.

TABLE 1

DRAM bandwidth consumption

| Search Range | P/B frame/field | ME1 | ME2 | Total |
|---|---|---|---|---|
| ±16 × ±16 | P frame | 2.93 | 2.50 | 5.43 |
| | P field | 2.93 | 5.00 | 7.93 |
| | B frame | 5.87 | 5.00 | 10.87 |
| | B field | 5.87 | 10.00 | 15.87 |
| ±32 × ±16 | P frame | 2.93 | 2.50 | 5.43 |
| | P field | 2.93 | 5.00 | 7.93 |
| | B frame | 5.87 | 5.00 | 10.87 |
| | B field | 5.87 | 10.00 | 15.87 |
| ±64 × ±32 | P frame | 4.80 | 2.50 | 7.30 |
| | P field | 4.80 | 5.00 | 9.80 |

TABLE 2

DRAM bandwidth consumption in ME2 implementation.

| Search Range | P/B frame/field | ME1 | ME2 | Total | Savings |
|---|---|---|---|---|---|
| ±16 × ±16 | P frame | 1.47 | 1.56 | 3.03 | 44.2% |
| | P field | 1.47 | 3.13 | 4.59 | 42.1% |
| | B frame | 2.93 | 3.13 | 6.06 | 44.2% |
| | B field | 2.93 | 6.25 | 9.18 | 42.1% |
| ±32 × ±16 | P frame | 1.47 | 1.56 | 3.03 | 44.2% |
| | P field | 1.47 | 3.13 | 4.59 | 42.1% |
| | B frame | 2.93 | 3.13 | 6.06 | 44.2% |
| | B field | 2.93 | 6.25 | 9.18 | 42.1% |
| ±64 × ±32 | P frame | 2.40 | 1.56 | 3.96 | 45.7% |
| | P field | 2.40 | 3.13 | 5.53 | 43.6% |

In table 1 as shown above, the first column lists the size of the search range of reference macroblocks, namely ±16×±16 pixels, ±32×±16 pixels, and ±64×±32 pixels. The second column of Table 1 lists which kind of motion estimation is executed, where the P frame refers to as the frame-based motion estimation being performed on P-VOP, P field refers to as the field-based motion estimation being performed on P-VOP, B frame refers to as the frame-based motion estimation being performed on B-VOP, and B field refers to as the field-based motion estimation being performed on B-VOP. The third and fourth columns illustrate the number of reading bits by the first motion estimation processor ME1 and second motion estimation processor ME2 respectively, which is represented by time periods of a frame. For search ranges of ±16×±16 pixels, and ±32×+16 pixels, the motion estimation processors include a buffer with a size of 18×8×16×8 bits. For the search range of ±64×±32 pixels, the buffer of the motion estimation processors is 50×8×16×8 bits. Table 1 shows the results acquired by a conventional motion estimation method in the prior art, whereas Table 2 shows the results acquired by the method in accordance with a preferred embodiment of the invention. The last column of the Table 2 illustrates an exemplary bandwidth reduction ratio of the present invention over the conventional motion estimation method, namely at least 43% of DRAM bandwidth savings.

In the above embodiment according to the invention, SAD (sum of absolute differences) is used as an example for clarifying the present invention to those skilled in the art, while other equivalent methods which can be used to identify the similarity of two image frames are also suitable for use in the present invention.

In a further embodiment of the present invention, the sum of square differences (SSD) of the current macroblock and reference macroblock is used in determining the motion vector between the current macroblock and reference macroblock. That is, $$SSD(a,b) = \sum_{i=0}^{n-1}\sum_{j=0}^{m-1}(Pc(k+i,l+j) - Pr(k+i+a,l+j+b))^2$$

$$-r/2 \leq a \leq r/2, \text{ and } -s/2 \leq b \leq s/2$$

where all the parameters identical to equation (3) have identical meanings as those defined in the above equation.

Moreover, in the present invention, the first motion estimation processor ME1 executes the following operation:

$$SSD(a,b) = \sum_{i=0}^{n-1}\sum_{j=0}^{m-1}(Sc(k+i,l+j) - Sr(k+i+a,l+j+b))^2$$

$$-r/2 \leq a \leq r/2, \text{ and } -s/2 \leq b \leq s/2$$

where Sc and Sr are identical to those defined above.

In another embodiment of the present invention, the sum of correlations (SC) of the current macroblock and reference macroblock are used in determining the motion vector between the current macroblock and reference macroblock. That is, $$SC(a, b) = \sum_{i=0}^{n-1}\sum_{j=0}^{m-1} Pc(k+i, l+j) \times Pr(k+i+a, l+j+b)$$
$$-r/2 \leq a \leq r/2, \text{ and } -s/2 \leq b \leq s/2$$

where all the parameters identical to equation (3) have identical meanings as those defined in the above equation. It should be noted that as the correlation method is utilized to determine the similarity of two image frames, the motion estimation is determined from the motion vector with the largest SC.

Similarly, in the present invention, for the first motion estimation processor ME1, the ME1 executes the following operation, $$SC(a, b) = \sum_{i=1}^{n}\sum_{j=1}^{m} Sc(k+i, l+j) \times Sr(k+i+a, l+j+b)$$
$$-r/2 \leq a \leq r/2, \text{ and } -s/2 \leq b \leq s/2$$

where Sc and Sr are; identical to those defined above.

Those skilled in the art should appreciate that although in the above description, an image frame is used as an object for motion estimation, for MPEG-4 it is allowable that the background and moving object are separated in storage. As required, the background image and object are assembled as a complete image. It is obvious from the above description that the present invention can be performed just for the moving object so as to acquire the motion estimation of a moving object. The same or substantially similar or equivalent algorithm can be applied to the moving object, where the contour of the macroblock based on the moving object is modified to fit the contour of the search range. For example, the original equation (3) can be replaced by the following equation, $$SAD(a, b) = \sum_{i,j \in C} | Pc(k+i, l+j) - Pr(k+i+a, l+j+b) |$$
$$\text{for } (a, b) \in H$$

wherein C represents the contour of the macroblock based on the moving object and H represents the contour of the search range. Similarly, the ME1 performs a sum operation based on these new contours.

It should be appreciated that in the present invention, the memory may be any suitable memory such as dynamic random access memory (DRAM) or static dynamic random access memory (SDRAM).

While the above is a detailed description of the specific embodiments of the invention, various modifications, alternative constructions and equivalents may be used to achieve substantially the same effects as the present invention. In particular, the process steps according to the invention as described herein and above can be similarly implemented by other similarly situated process steps achieving substantially the same result. Therefore, the above description and illustrations should not be taken as limiting the scope of the present invention which is defined by the appended claims and their equivalents.

We claim:

1. A motion estimation method comprising the steps of:
    (a) displaying an image in a plurality of frames corresponding to a plurality of time periods; wherein each frame further comprises a given number of pixels, each pixel represented by two-dimensional abscissa and ordinate coordinates;
    wherein each frame further comprises at least one macroblock having a lesser number of pixels than said given number of pixels of said frame;
    wherein a current frame is one of said frames in a current time period of said plurality of time periods;
    wherein said current frame further comprises at least one current macroblock having a lesser number of pixels than said given number of pixels of said current frame;
    wherein a reference frame is one of said frames in a time period of said plurality of time periods prior to said current time period for said current frame;
    wherein said reference frame further comprises at least one reference macroblock having a lesser number of pixels than said given number of pixels of said reference frame;
    (b) determining calculated pixel units of said current macroblock, wherein one calculated pixel unit is an average of two adjacent pixels;
    (c) repeating step (b) for all pixels of said current macroblock;
    (d) determining calculated pixel units of one macroblock of said reference macroblocks;
    (e) repeating step (d) for all pixels of said one reference macroblock;
    (f) multiplying each calculated pixel unit of said current macroblock by a corresponding calculated pixel unit of said one reference macroblock resulting in a plurality of multiplying values;
    (h) summing the plurality of multiplying values resulting in a sum of correlations (SC);
    (i) shifting abscissa and ordinate coordinates of said one reference macroblock by corresponding abscissa and ordinate shift values resulting in a shifted reference macroblock;
    (j) determining calculated pixel units of said shifted reference macroblock;
    (k) repeating step (j) for all pixels of said shifted reference macroblock;
    (l) multiplying each calculated pixel unit of said current macroblock by a corresponding calculated pixel unit of said shifted reference macroblock resulting in an additional plurality of multiplying values;
    (n) summing said additional plurality of multiplying values resulting in an additional SC;
    (o) repeating steps (i), (j), (k), (l), (m) and (n) for each reference macroblock resulting in a plurality of additional SCs; and
    (p) selecting a selected SC from a group comprising the SC and said additional SCs, wherein the selected SC has a larger value than another of the group.

2. The method of claim 1 wherein said reference frame and said current frame are formed by even lines and odd lines.

3. The method of claim 2 further comprising determining a top field motion estimation using pixels in said even lines.

4. The method of claim 2 further comprising determining a bottom field motion estimation using pixels in said odd lines.

* * * * *